United States Patent
Na et al.

(10) Patent No.: US 11,276,249 B2
(45) Date of Patent: Mar. 15, 2022

(54) METHOD AND SYSTEM FOR VIDEO ACTION CLASSIFICATION BY MIXING 2D AND 3D FEATURES

(71) Applicant: International Business Machines Corporation, Armonk, NY (US)

(72) Inventors: Han Na, Pflugerville, TX (US); Rei Odaira, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 83 days.

(21) Appl. No.: 15/931,796

(22) Filed: May 14, 2020

(65) Prior Publication Data

US 2021/0357647 A1   Nov. 18, 2021

(51) Int. Cl.
| | | |
|---|---|---|
| *G06V 20/00* | (2022.01) | |
| *G06V 20/40* | (2022.01) | |
| *G06N 3/08* | (2006.01) | |
| *G06K 9/62* | (2022.01) | |

(52) U.S. Cl.
CPC .............. *G06V 20/41* (2022.01); *G06K 9/629* (2013.01); *G06K 9/6217* (2013.01); *G06N 3/08* (2013.01); *G06V 20/46* (2022.01)

(58) Field of Classification Search
CPC ........... G06K 9/00718; G06K 9/00744; G06K 9/6217; G06K 9/629; G06N 3/08
See application file for complete search history.

(56) References Cited

U.S. PATENT DOCUMENTS

| | | | |
|---|---|---|---|
| 10,198,637 B2 | 2/2019 | Tran et al. | |
| 2018/0032846 A1* | 2/2018 | Yang | ..................... G06K 9/4604 |
| 2019/0188482 A1 | 6/2019 | Knittel et al. | |
| 2019/0332942 A1* | 10/2019 | Wang | .................... G06K 9/6267 |
| 2020/0160972 A1* | 5/2020 | Beriault | ................... G06T 7/246 |

FOREIGN PATENT DOCUMENTS

| | | | |
|---|---|---|---|
| WO | 2018174623 A1 | 9/2018 | |
| WO | 2018210796 A1 | 11/2018 | |

OTHER PUBLICATIONS

Zheng-ping Hu, Le Zhang, Shu-fang Li, De-gang Sun, Parallel spatial-temporal convolutional neural networks for anomaly detection and location in crowded scenes, Journal of Visual Communication and Image Representation, vol. 67, 2020, 102765, ISSN 047-3203 (Year: 2020).*

(Continued)

*Primary Examiner* — Fayyaz Alam
(74) *Attorney, Agent, or Firm* — Terrile, Cannatti & Chambers, LLP; Michael Rocco Cannatti (57) ABSTRACT

A method, system, and computer program product provide for video action classification by selecting a first video frame and a first plurality of video frames from a received video to process the first video frame with a 2D convolutional neural network processing pathway to extract spatial features classifying the first video frame, and to process the first plurality of video frames with a 3D convolutional neural network processing pathway to extract spatiotemporal features classifying the first plurality of video frames so that the spatial features are combined with the spatiotemporal features to generate a classification label for the video action.

17 Claims, 5 Drawing Sheets

(56) References Cited

OTHER PUBLICATIONS

X. Li, L. Wen, J. Wang and M. Zeng, "Spatio-temporal Collaborative Convolution for Video Action Recognition," 2020 IEEE International Conference on Artificial Intelligence and Computer Applications (ICAICA), 2020, pp. 554-558, doi: 10.1109/ICAICA50127.2020.9182498. (Year: 2020).*

C. Li, Q. Zhong, D. Xie and S. Pu, "Collaborative Spatiotemporal Feature Learning for Video Action Recognition," 2019 IEEE/CVF Conference on Computer Vision and Pattern Recognition (CVPR), 2019, pp. 7864-7873, doi: 10.1109/CVPR.2019.00806. (Year: 2019).*

Carreira, J., et al., (2018) 'Quo vadis, action recognition? a new model and the kinetics dataset', v3, 10 pages, last modified Feb. 12, 2018.

Feichtenhofer., C et al., (2019) 'SlowFast Networks for Video Recognition' v3, Computer Vision and Pattern Recognition (cs.CV), 10 pages, published Oct. 29, 2019.

He, D. et al., (2018) 'StNet: local and global spatial-temporal modeling for action recognition' v3, 8 pages, published Dec. 11, 2018.

Hou, R. et al., (2017) 'Tube Convolutional Neural Network (T-CNN) for Action Detection in Videos' v3, last revised Aug. 2 Aug. 2, 2017.

Sun, L. et al., (2015) 'Human Action Recognition using Factorized Spatio-Temporal Convolutional Networks' v1, 9 pages, published Oct. 2, 2015.

Szegedy, C. et al., (2014) 'Going deeper with convolutions', 12 pages, published Sep. 17, 2014.

Wang, M. et al., (2017) '3DensiNet: A Robust Neural Network Architecture towards 3D Volumetric Object Prediction from 2D Image', MM'17: ACM Multimedia Conference, pp. 961-969, published Oct. 27, 2017.

Xie, S. et al., (2018) 'Rethinking spatiotemporal feature learning: speed-accuracy trade-offs in video classification', v2, 17 pages, published Jul. 27, 2018.

Zhou, Y. et al., (2018) 'MiCT: Mixed 3D/2D Convolutional Tube for Human Action Recognition', Proc. IEEE/CVF Conf. on Computer Vision and Pattern Recognition (CPVR), pp. 449-458, presented between Jun. 18-23, 2018, first available/last modified electronically Jan. 16, 2019.

CS231n Convolutional Neural Networks for Visual Recognition, 17 pages, 2018.

He, K. et al., (2015) Deep Residual Learning for Image Recognition, 2015.

Missinglink.AI, Fully Connected Layers in Convolutional Neural Networks: The Complete Guide, undated, retrieved from internet Mar. 21, 2020, 7 pages.

Lecun, Y et al., Object Recognition with Gradient-Based Learning, 28 pages, Oct. 1999.

* cited by examiner

| layer name | output size | Mixed ResNet50 | |
|---|---|---|---|
| | | 2D ResNet50 | 3D ResNet50 |
| conv1 | 2D: 150×150<br>3D: 9×150×150 | 7×7, stride 2 | 7×7×7, stride 1 (T) 2 (XY) |
| pooling1 | 2D: 74×74<br>3D: 7×74×74 | 3×3 max pool, stride 2 | 3×3×3 max pool, stride 1 (T) 2 (XY) |
| add | | expand 2D output, add to 3D one | |
| conv2_x | 2D: 74×74<br>3D: 7×74×74 | $\begin{bmatrix}1\times1, 64\\3\times3, 64\\1\times1, 256\end{bmatrix}\times3$ | $\begin{bmatrix}1\times1\times1, 64\\3\times3\times3, 64\\1\times1\times1, 256\end{bmatrix}\times3$ |
| add | | expand 2D output, add to 3D one | |
| conv3_x | 2D: 37×37<br>3D: 7×37×37 | $\begin{bmatrix}1\times1, 128\\3\times3, 128\\1\times1, 512\end{bmatrix}\times4$ | $\begin{bmatrix}1\times1\times1, 128\\3\times3\times3, 128\\1\times1\times1, 512\end{bmatrix}\times4$ |
| add | | expand 2D output, add to 3D one | |
| conv4_x | 2D: 19×19<br>3D: 7×19×19 | $\begin{bmatrix}1\times1, 256\\3\times3, 256\\1\times1, 1024\end{bmatrix}\times6$ | $\begin{bmatrix}1\times1\times1, 256\\3\times3\times3, 256\\1\times1\times1, 1024\end{bmatrix}\times6$ |
| add | | expand 2D output, add to 3D one | |
| conv5_x | 2D: 10×10<br>3D: 7×10×10 | $\begin{bmatrix}1\times1, 512\\3\times3, 512\\1\times1, 2048\end{bmatrix}\times3$ | $\begin{bmatrix}1\times1\times1, 512\\3\times3\times3, 512\\1\times1\times1, 2048\end{bmatrix}\times3$ |
| pooling | 2D: 2048<br>3D: 2048 | global average pool | global average pool |
| merge | | concatenate, 10→339-d fc, softmax | |

METHOD AND SYSTEM FOR VIDEO ACTION CLASSIFICATION BY MIXING 2D AND 3D FEATURES

BACKGROUND OF THE INVENTION

The rapidly growing field of video action classification has many applications and scenarios where video action classification is increasingly making significant contributions in areas such as human-computer interaction, medicine, and autonomous driving. However, existing video classification approaches use convolutional neural network-based solutions that require excessive computational resources while providing poor accuracy. For example, the application of existing 2D convolutional neural network (CNN) solutions for classifying videos does not achieve the same accuracy as they do for images because the 2D CNN solutions track only spatial features from video frames. And while there are proposals for inflating 2D CNN into inflated 3D networks that can capture both spatial and temporal features, existing inflated 3D networks use a single processing pathway that is not good at recognizing both slow motion (many spatial features) and fast motion (many temporal features). And while there have been recent proposals for using multi-pathway 3D networks to perform video classification, such multi-path 3D CNN solutions require huge computational resources and processing complexity to extract temporal and spatial features on multiple pathways. In addition, there are significant training costs associated with 3D CNN networks in the absence of training data for such networks. As a result, the existing solutions for video action classification are deficient at a practical and/or operational level by virtue of imposing undue computational cost and processing complexity to achieve poor or suboptimal labelling accuracy.

SUMMARY

Broadly speaking, selected embodiments of the present disclosure provide a method, system, and apparatus for classifying video action by using a mixed 2D-3D network architecture that captures both spatial and spatiotemporal features separately from videos without a huge computation cost to accurately generate video action classification labels. In selected embodiments, a video action classifier is embodied with two, parallel processing pathways, including a 2D CNN-based pathway and a 3D CNN-based pathway which is inflated from the 2D CNN. The 2D CNN-based pathway is connected and configured to receive a selected image frame from an input video and to process the image frame to capture spatial features from the image frame. In addition or in parallel, the 3D CNN-based pathway is connected and configured to receive a video portion (e.g., multiple selected image frames) from the input video and to process the video portion to capture spatiotemporal features from the video portion. By constructing the 2D and 3D CNN-based pathways have the same structure, connections between the 2D and 3D CNN-based pathways can be used to fuse features from the two pathways. For example, spatial features extracted from intermediate 2D CNN processing stages may be fused with spatiotemporal features derived by the intermediate 3D CNN processing stages, and then concatenated at a last stage to connect to a final, fully connected layer for use in classification of the video portion. Another advantage of constructing the 3D CNN by inflating the 2D CNN is that pre-trained 2D CNN weights can be leveraged to reduce the training time and consumption of computation resources under this mixed 2D-3D network architecture.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein:

FIG. 5 is a chart illustrating an example implementation of a mixed 2D-3D video action classifier in accordance with selected embodiments of the present disclosure.

DETAILED DESCRIPTION

The present invention may be a system, a method, and/or a computer program product. In addition, selected aspects of the present invention may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present invention may take the form of computer program product embodied in a computer readable storage medium (or media) having computer readable program instructions thereon for causing a processor to carry out aspects of the present invention. Thus embodied, the disclosed system, a method, and/or a computer program product is operative to improve the functionality and operation of a cognitive question answering (QA) systems by efficiently providing more accurate video action classification.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments described herein may enable more efficient and accurate video action classification and/or artificial intelligence comprehension in a number of scenarios, including but limited to video assistant referees, human-computer interaction, autonomous driving, and the like. The video action classification methodology may combine multiple processing pathways—including a first pretrained 2D network and a second 3D network this is derived from the first pretrained 2D network—to process in parallel an input image frame (to extract spatial features) and a plurality of input image frames (to extract spatiotemporal features), and to combine the final spatiotemporal features in a final, fully-connected layer to present a video action label based on the mixed 2D-3D models so that the video action can be quickly and accurately classified. The video action classification device may include a variety of different components, such as sensors that obtain data regarding the environment, processing units and/or other components for generating and/or applying the plurality of neural network models, and so on. These and other embodiments are discussed below with reference to FIGS. 1-6. However, those skilled in the art will readily appreciate that the detailed description given herein with respect to these Figures is for explanatory purposes only and should not be construed as limiting.

Figure 1:
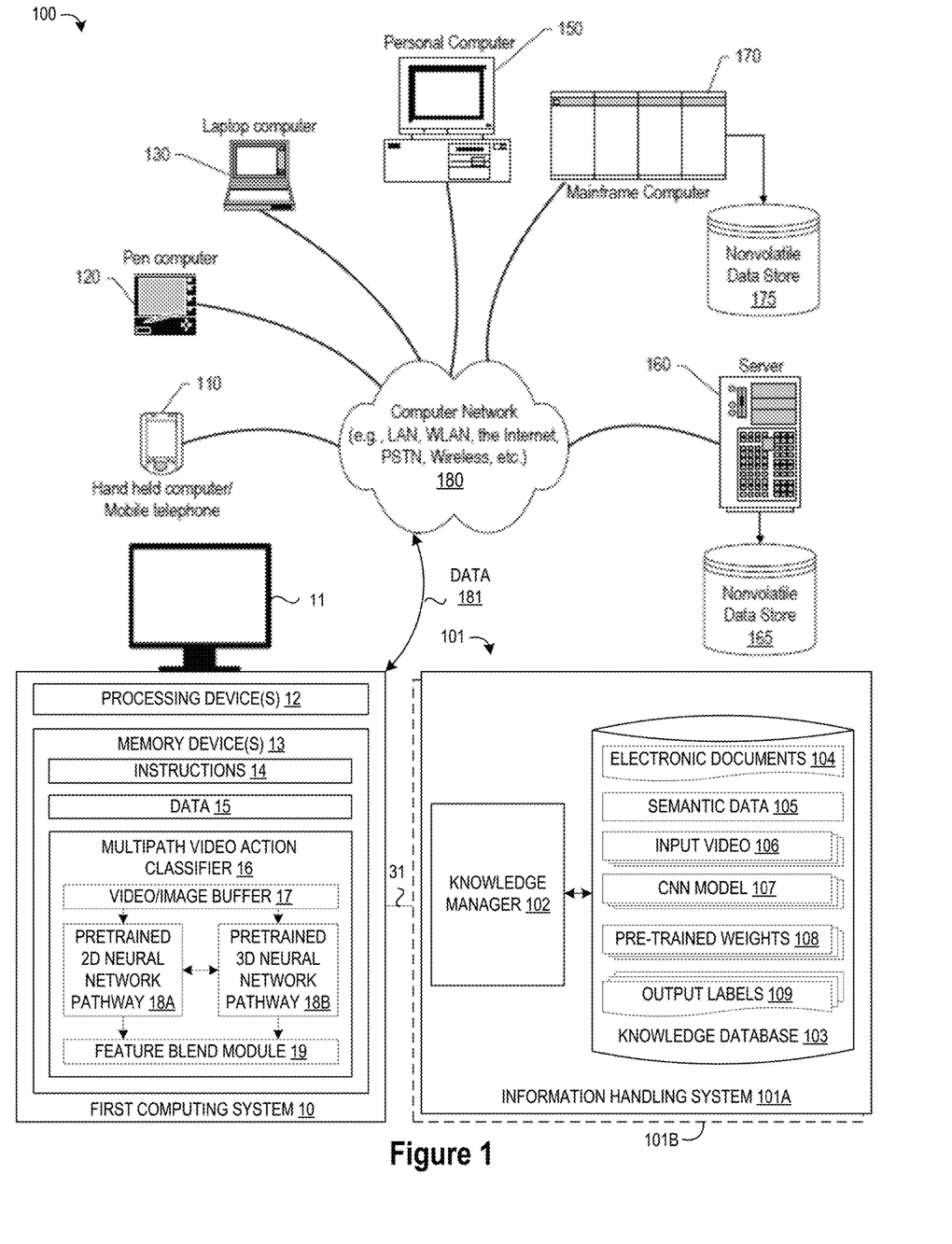
FIG. 1 depicts a system diagram that includes a video action classification device connected which uses a mixed 2D-3D network architecture to capture both spatial and spatiotemporal features separately from videos in accordance with selected embodiments of the present disclosure.

To provide additional details for an improved understanding of selected embodiments of the present disclosure, reference is now made to FIG. 1 which depicts a network environment 100 in which an information handling system and/or computing system includes a multipath video action classifier 16 which is connected and configured to use a mixed 2D-3D network architecture to capture both spatial and spatiotemporal features separately from videos. Types of information handling systems range from small handheld devices, such as handheld computer/mobile telephone 110 to large mainframe systems, such as mainframe computer 170. Examples of handheld computer 110 include personal digital assistants (PDAs), personal entertainment devices, such as Moving Picture Experts Group Layer-3 Audio (MP3) players, portable televisions, and compact disc players. Other examples of information handling systems include pen, or tablet, computer 120, laptop or notebook computer 130, personal computer system or workstation 150, server 160, and mainframe computer 170. Other types of information handling systems that are not individually shown in FIG. 1 are represented by information handling system 101. As shown, the various information handling systems can be networked together using computer network 180. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. The embodiment of the information handling system shown in FIG. 1 includes separate nonvolatile data stores (more specifically, server 160 utilizes nonvolatile data store 165, mainframe computer 170 utilizes nonvolatile data store 175, and information handling system 101 is embodied with a first computing system 11 which utilizes nonvolatile data store 20).

As described more fully hereinbelow, an example information handling system 101 may be embodied as a server computing system that may include one or more system pipelines 101A, 101B, each of which includes a knowledge manager computing device 104 (comprising one or more processors and one or more memories, and potentially any other computing device elements generally known in the art including buses, storage devices, communication interfaces, and the like) for processing information data 31 received from the first computing system 10, as well as information data 181 received over the network 180 from one or more users at computing devices (e.g., 110, 120, 130). In this way, the computing devices communicate with each other and with other devices or components via one or more wired and/or wireless data communication links, where each communication link may comprise one or more of wires, routers, switches, transmitters, receivers, or the like. As depicted, the information handling system 101 may include or be connected to a first computing device, such as the first computing system 10, that is specifically configured to implement a multipath video action classifier 16. The configuring of the computing device may comprise the providing of application specific hardware, firmware, or the like to facilitate the performance of the operations and generation of the outputs described herein with regard to the illustrative embodiments. In addition or in the alternative, the configuring of the computing device may include storing software applications in one or more storage devices and loaded into memory of a computing device, such as the information handling system 101, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

To provide input data and/or embeddings, the information handling system 101 may receive data input 181 from the network 180, one or more knowledge databases or corpora 103 which store electronic documents 104, semantic data 105, input video 106, one or more convolutional neural network models 107, training weights 108, output labels 109, or other input/output data. In selected embodiments, the input video 106 may be stored in the knowledge database 103 as one or more video image frames or video action segments. In addition, the convolutional neural network model(s) 107 may be stored in the knowledge database 103 as a pretrained 2D CNN model and one or more additional 3D CNN models, where at least one of the 3D CNN models is an inflated 3D CNN model that is built or derived from the pretrained 2D CNN model. Also, the training weights 108 stored in the knowledge database 103 may include pretrained weights for any suitable pretrained convolutional neural network, such as the ResNet-50 convolutional neural network which can be loaded as pretrained version of a 2D network trained on more than a million images from the ImageNet database, though other pretrained deep neural networks may also be used. Upon receiving the input video 106 and input CNN models 107 (alone or in combination with the pre-trained weights 108) and executing the multipath video action classifier 16, the first computing device is configured into a specialized computing device specifically configured to implement the mechanisms of the illustrative embodiments for generating output labels 109 for each input video action segment 106, and is not a general-purpose computing device. Moreover, as described hereafter, the implementation of the mechanisms of the illustrative embodiments improves the functionality of the computing device and provides a useful and concrete result that accelerates the classification of video action to efficiently provide more accurate classification labels without requiring excessive computational resources and/or training time.

In selected embodiments, the information handling system 101 may be implemented with a first computing device 10 that includes a display 11, one or more processing devices 12, and a memory or database storage 13. In the first computing system 10, a processing device 12, such as a natural language processor (NLP), executes program code instructions 14 and data 15 stored in memory 13 for implementing a multipath video action classifier engine 16. In operation, the multipath video action classifier engine 16 receives, evaluates, and processes input video 106 using a mixed 2D-3D network architecture that captures both spatial and spatiotemporal features from the input video 106 at the feature blend module 19 to accurately and efficiently generate video action classification labels 109. To this end, the multipath video action classifier engine 16 includes a video/image buffer 17 which is connected to store input video image frames from the input video 106. The multipath video action classifier engine 16 also includes multiple processing pathways, including, for example, a 2D neural network-based pathway 18A and a 3D neural network-based pathway 18B. In selected embodiments, the 2D neural network-based pathway 18A is a multi-layer convolutional neural network or a pretrained convolutional neural network, such as a ResNet50-ImageNet Pretrained network that may be stored as a CNN model 107 in the knowledge database 103. In other embodiments, the 3D neural network-based pathway 18B is a multi-layer 3D convolutional neural network which is inflated from the (pretrained) 2D neural network pathway 18A. In operation, the 2D CNN-based pathway 18A is connected and configured to receive a selected image frame from an input video 106 for storage in the video/image buffer 17, and to process the image frame to capture spatial features from the image frame. In addition or in parallel, the 3D CNN-based pathway 18B is connected and configured to receive multiple selected image frames (e.g., a video portion) from the video/image buffer 17 and to process the video portion to capture spatiotemporal features from the video portion. By constructing the 2D and 3D CNN-based pathways 18A, 18B to have the same structure, connections between the 2D and 3D CNN-based pathways can be used to fuse spatial and spatiotemporal features from the two pathways 18A, 18B to form a final one-dimensional vector which connects to one or more fully connected layers for use in classification of the input video image frames. To this end, the multipath video action classifier engine 16 includes a feature blend module 19 which is connected and configured to combine spatial pathway extracted features extracted from the selected frame by the 2D CNN pathway 18A with extracted spatiotemporal features derived by the 3D CNN pathway 18B.

Figure 2:
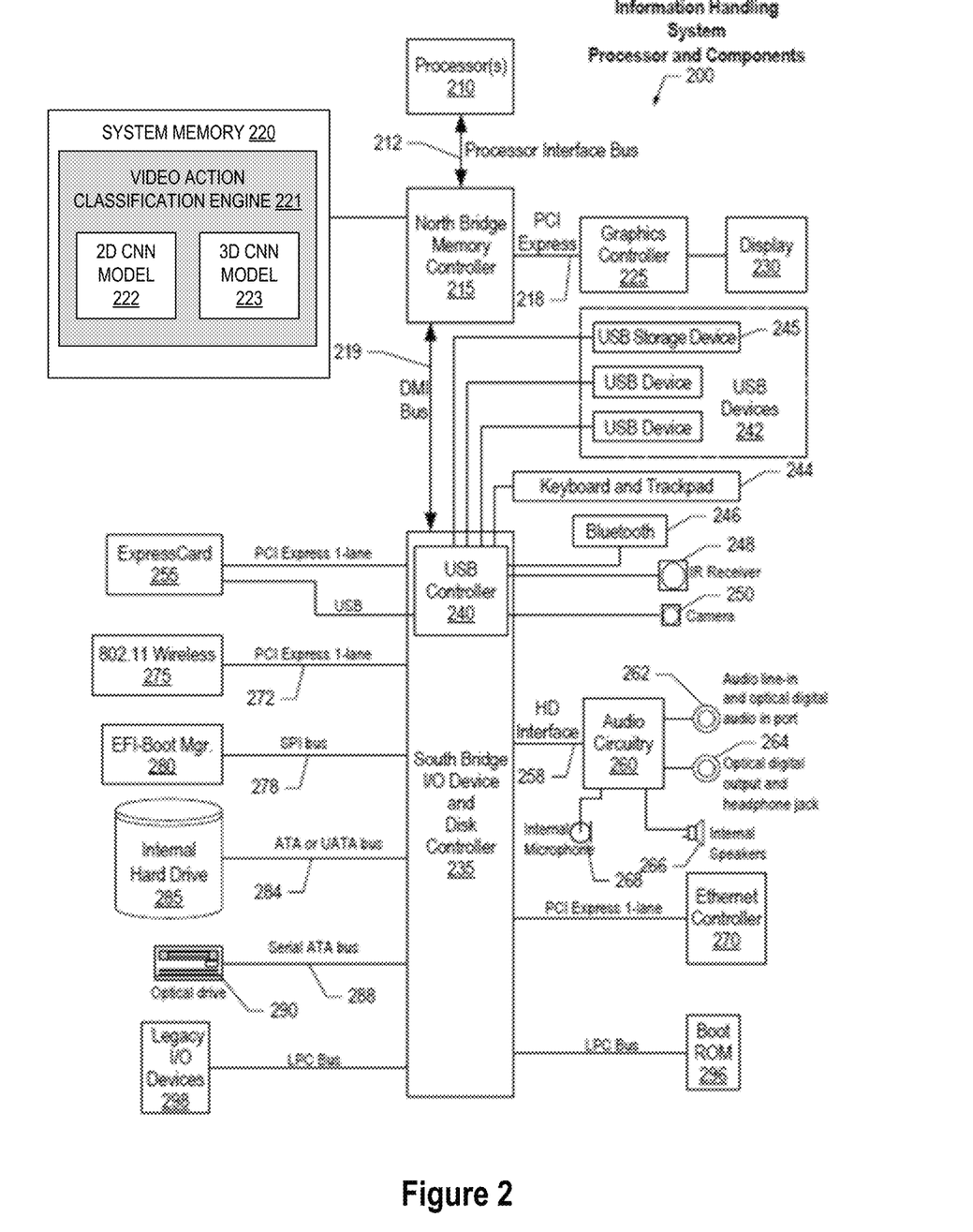
FIG. 2 is a block diagram of a processor and components of an information handling system such as those shown in FIG. 1.

To provide additional details for an improved understanding of selected embodiments of the present disclosure, reference is now made to FIG. 2 which illustrates an information handling system 200, more particularly, a processor and common components, which is a simplified example of a computer system capable of performing the computing operations described herein. Information handling system 200 includes one or more processors 210 coupled to processor interface bus 212. Processor interface bus 212 connects processors 210 to Northbridge 215, which is also known as the Memory Controller Hub (MCH). Northbridge 215 connects to system memory 220 and provides a means for processor(s) 210 to access the system memory. In the system memory 220, a variety of programs may be stored in one or more memory devices, including a video action classification engine module 221 which may be invoked for processing video/image data using a mixed 2D-3D network architecture which may be used to dynamically identify and classify video action in a received input video. To this end, the system memory 220 may include a first neural network image classifier model 222 (such as a 2D CNN model 222 which may be pretrained on an image dataset) and a second neural network image classifier model 223 (such as a 3D CNN model which is derived or inflated from the 2D CNN model) which are operatively combined to capture both spatial and spatiotemporal features separately from video frames and associated video segments without a huge computation cost to accurately generate video action classification labels. Graphics controller 225 also connects to Northbridge 215. In one embodiment, PCI Express bus 218 connects Northbridge 215 to graphics controller 225. Graphics controller 225 connects to display device 230, such as a computer monitor.

Northbridge 215 and Southbridge 235 connect to each other using bus 219. In one embodiment, the bus is a Direct Media Interface (DMI) bus that transfers data at high speeds in each direction between Northbridge 215 and Southbridge 235. In another embodiment, a Peripheral Component Interconnect (PCI) bus connects the Northbridge and the Southbridge. Southbridge 235, also known as the I/O Controller Hub (ICH), is a chip that generally implements capabilities that operate at slower speeds than the capabilities provided by the Northbridge. Southbridge 235 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 296 and "legacy" I/O devices (using a "super I/O" chip). The "legacy" I/O devices (298) can include, for example, serial and parallel ports, keyboard, mouse, and/or a floppy disk controller. Other components often included in Southbridge 235 include a Direct Memory Access (DMA) controller, a Programmable Interrupt Controller (PIC), and a storage device controller, which connects Southbridge 235 to non-volatile storage device 285, such as a hard disk drive, using bus 284.

ExpressCard 255 is a slot that connects hot-pluggable devices to the information handling system. ExpressCard 255 supports both PCI Express and USB connectivity as it connects to Southbridge 235 using both the Universal Serial Bus (USB) the PCI Express bus. Southbridge 235 includes USB Controller 240 that provides USB connectivity to devices that connect to the USB. These devices include webcam (camera) 250, infrared (IR) receiver 248, keyboard and trackpad 244, and Bluetooth device 246, which provides for wireless personal area networks (PANs). USB Controller 240 also provides USB connectivity to other miscellaneous USB connected devices 242, such as a mouse, removable nonvolatile storage device 245, modems, network cards, ISDN connectors, fax, printers, USB hubs, and many other types of USB connected devices. While removable nonvolatile storage device 245 is shown as a USB-connected device, removable nonvolatile storage device 245 could be connected using a different interface, such as a Firewire interface, etc.

Wireless Local Area Network (LAN) device 275 connects to Southbridge 235 via the PCI or PCI Express bus 272. LAN device 275 typically implements one of the IEEE 802.11 standards for over-the-air modulation techniques to wireless communicate between information handling system 200 and another computer system or device. Extensible Firmware Interface (EFI) manager 280 connects to Southbridge 235 via Serial Peripheral Interface (SPI) bus 278 and is used to interface between an operating system and platform firmware. Optical storage device 290 connects to Southbridge 235 using Serial ATA (SATA) bus 288. Serial ATA adapters and devices communicate over a high-speed serial link. The Serial ATA bus also connects Southbridge 235 to other forms of storage devices, such as hard disk drives. Audio circuitry 260, such as a sound card, connects to Southbridge 235 via bus 258. Audio circuitry 260 also provides functionality such as audio line-in and optical digital audio in port 262, optical digital output and headphone jack 264, internal speakers 266, and internal microphone 268. Ethernet controller 270 connects to Southbridge 235 using a bus, such as the PCI or PCI Express bus. Ethernet controller 270 connects information handling system 200 to a computer network, such as a Local Area Network (LAN), the Internet, and other public and private computer networks.

While FIG. 2 shows one information handling system, an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory. In addition, an information handling system need not necessarily embody the north bridge/south bridge controller architecture, as it will be appreciated that other architectures may also be employed.

Figure 3:
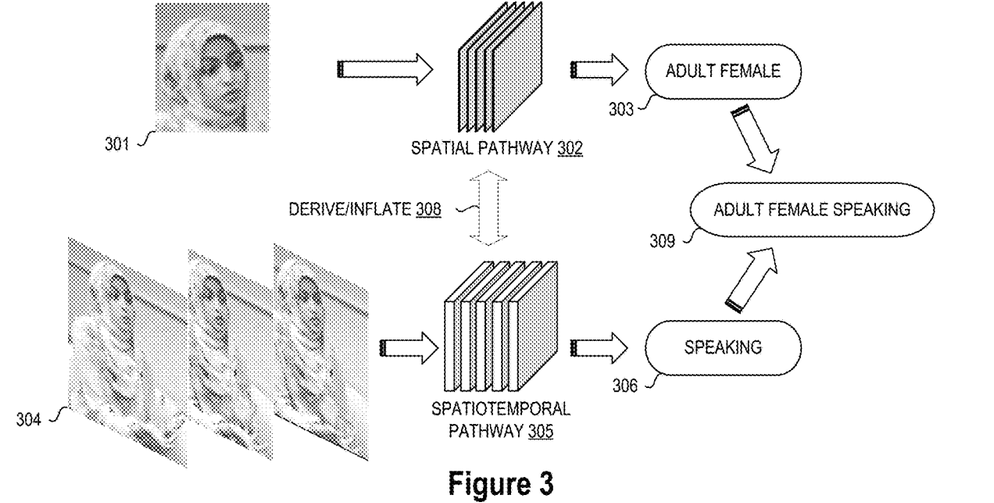
FIG. 3 is a simplified illustration showing an input video action being classified with multiple classification pathways in accordance with selected embodiments of the present disclosure.

To provide additional details for an improved understanding of selected embodiments of the present disclosure, reference is now made to FIG. 3 which depicts a simplified illustration 300 of an input video that is received for video action analysis and classification. As illustrated, the input video is characterized by a first extracted image frame 301 that is selected from the input video, and a second extracted set of image frames 304 that are selected from the input video. The extracted image frame(s) 301, 304 are then classified with multiple classification pathways 302, 305 to generate an output video action classification label 309. In the illustrated example, the first extracted image frame 301 from the input video depicts an adult female, while the second extracted set of image frames 304 from the input video depict the video action of the adult female speaking. The first extracted image frame 301 is processed at a spatial pathway 302 which may be embodied as a 2D convolutional neural network that is initialized with pretrained weights to form a 2D spatial pathway 302. In addition, the second extracted set of image frames 304 is processed at a spatiotemporal pathway 305 which may be embodied as a 3D convolutional neural network that forms a 3D spatiotemporal pathway 305. In selected embodiments, the 3D spatiotemporal pathway 305 is formed with a derivation process 308 which inflates the 2D CNN 302 into the 3D CNN 305. For example, the derivation process 308 may build upon a state-of-the-art 2D image classification architecture (e.g., ResNet50-ImageNet Pretrained model) by inflating its filters, pooling kernels, and/or other parameters into a 3D CNN model 305 to provide very deep, naturally spatiotemporal classifier. By processing the extracted image frame(s) 301, 304 in parallel at multiple classification pathways 302, 305, the spatial features extracted by the 2D CNN pathway 302 from the selected frame 301 contains a first feature map of the spatial information 303 (e.g., "adult female") in the selected frame 301, and simultaneously, the spatiotemporal features extracted by the 3D CNN pathway 305 from the extracted set of image frames 304 contains a second feature map of the spatiotemporal information 306 (e.g., "speaking") in the set of images frames 304. By constructing the 3D CNN pathway 305 from the 2D CNN pathway 302 so that the spatial features extracted at each (intermediate) stage of the 2D CNN pathway 305 are fused with corresponding spatiotemporal features extracted at each (intermediate) stage of the 3D CNN pathway 307, the extracted spatial and spatiotemporal features derived by the 2D and 3D CNN pathways 302, 305 may be concatenated at a last stage to form a one-dimensional vector, followed by one or more fully connected layers that are used for classifying the video action of the input video.

Figure 4:
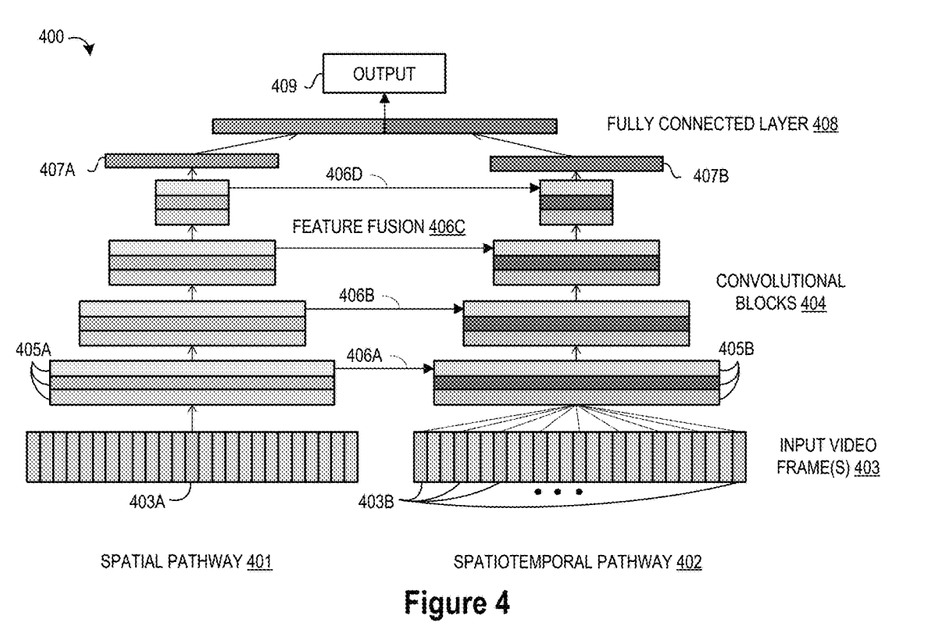
FIG. 4 is a simplified illustration showing a mixed 2D-3D network architecture where multiple, parallel neural network processing pathways are used to classify video action by separately capturing both spatial and spatiotemporal features from a shared video input in accordance with selected embodiments of the present disclosure.

To provide additional details for an improved understanding of selected embodiments of the present disclosure, reference is now made to FIG. 4 which depicts a simplified illustration of a mixed 2D-3D network architecture 400 where multiple, parallel neural network processing pathways or models 401, 402 are used to classify video action by separately capturing both spatial and spatiotemporal features from a shared video input. The disclosed architecture 400 is built upon a first neural network-based processing pathway/model 401 which processes a single selected frame 403A from the input video 403 using a plurality (e.g., 4) of convolutional block stages 404 to extract spatial features. At each convolutional block stage 404, an input (e.g., a single vector) is received and transformed through a series of layers (e.g., 3) 405A to generate an output layer (e.g., 406A-D) which is passed a CNN block stage output. In this way, the processing at the CNN block stages 404 begins with convolution and pooling to break down the input image 403A into features which are analyzed independently at a plurality of layers. The result of this process feeds into a fully connected neural network structure 407A that extracts spatial features. Since there have been a number of very successful image classification architectures developed over the years, any suitable image classifier may be used for the first neural network-based processing pathway 401 to extract spatial features from the input image 403A, such as a 2D CNN-based (e.g., a ResNet50-ImageNet CNN) classifier.

Using the first neural network-based model 401 as a starting point, the second neural network-based processing pathway or model 402 may be derived or constructed by inflating the first neural network-based model 401. For example, a 2D CNN model 401 may be converted into a 3D CNN model 402 by starting with a 2D architecture, and then inflating all the filters and pooling kernels too endow them with an additional temporal dimension. For example, a square filter in the 2D CNN model can be converted to a cubic filter—N×N filters become N×N×N. In constructing the second neural network-based processing pathway/model 402, the output spatial features (e.g., 406A-D) from each convolutional block stage 404 are fused to the corresponding output spatiotemporal features from the 3D CNN pathway 404 at every stage. Thus constructed, the second neural network-based processing pathway/model 402 is constructed and connected to process a plurality of selected frames or video clip 403B from the input video 403 using a plurality (e.g., 4) of corresponding convolutional block stages 404 to extract spatiotemporal features. The final spatiotemporal feature outputs 407A-B from the convolutional block stages 404 are concatenated or combined into a final one-dimensional vector, followed by at least one fully connected layer 408 which are provided as the final classifier output 409.

To provide additional details for an improved understanding of selected embodiments of the present disclosure, reference is now made to FIG. 5 which depicts a chart 500 illustrating an example implementation of a mixed 2D-3D video action classifier which uses a 2D ResNet50 neural network-based processing pathway (to derive spatial features from a selected frame of an input video) in combination with an inflated 3D ResNet50 neural network-based processing pathway (to derive spatiotemporal features from a plurality of selected frames of the input video) which was generated by inflating the 2D ResNet50 neural network-based processing pathway. As indicated in the chart 500, the 2D and 3D ResNet50 neural network-based processing pathways are each constructed to implement a plurality (e.g., 5) of convolutional block stages, each of which performs convolution and/or pooling processing for addition and output to the next convolutional block. The extracted feature maps from the 2D ResNet50 pathway and the 3D ResNet50 are converted to two one-dimensional vectors separately by a global average pooling operation, and resulting a final one-dimensional vector, which followed by a fully connected layer to generate the classification results.

To illustrate the separate contributions of the mixed 2D-3D video action classifier at each convolutional block stage, the chart 500 includes a first column ("layer name") which identifies each processing stage (e.g., "conv1" and "pooling 1" for the first convolutional block). The chart 500 also includes a second column ("output size") which identifies the output sizes of the spatial and spatiotemporal feature maps from the 2D and 3D ResNet50 neural network-based processing pathways, respectively. As the "output size" column shows, the sizes of the matrix outputs reduce through each convolutional block stage, ultimately resulting 2048 bit vectors being output from the last stage of the 2D and 3D ResNet50 neural network-based processing pathways. In the third column of the chart 500, the 2D ResNet50 neural network-based processing operations are performed on a selected middle frame from each input video being classified, with the resulting processing results of each convolutional block stage being listed in the different rows. In similar fashion, the fourth column of the chart 500 shows the 3D ResNet50 neural network-based processing operations that are performed on 9 extracted frames (e.g., every 8 frames) from the input video being classified, with the resulting processing results of each convolutional block stage being listed in the different rows below. As indicated in the third and fourth columns of the chart 500, each processing layer matrix in a 2D convolutional block stage (e.g., stage 2) is inflated to form a corresponding processing layer metric in the corresponding 3D convolutional block stage, simply by adding one additional matrix dimension. At the last convolutional block stage, the output vectors are computed as the global average pool of the final 2D and 3D ResNet50 neural network-based processing pathways, and then merged into a single concatenated vector (e.g., 4096 bits), the concatenated vector is followed by a fully connected layer, which results a 339 bits vector (the video dataset includes 339 different actions), and each bit position signifies a different, predetermined classification label outcome.

In this example implementation, the 2D ResNet50 neural network-based processing pathway is implemented with the "moments in time" dataset having weights that are initialized with the ImageNet-pretrained ResNet50. By training the last fully connected layer (a.k.a., bottleneck layer) only over 20 epochs, and then unfreezing and training all layers over 20 epochs, training times can be reduced for obtained accurate image classification. In particular, the hyperparameters to train this example of implementation including the learning rate, learning rate decay, and momentum were configured as 0.0001, 0.0001, and 0.9 respectively, with training results including a best validation accuracy rate of 15%, an average time per epoch requirement of 12.46 hours in the first 20 epochs (trained the last fully connected layer), and 16.59 hours in the second 20 epochs (trained all layers), and total training time requirement of 580.91 hours. Under computed modeling estimates, the validation accuracy results of the mixed 2D-3D video action classifier is better than the results of a 2D image classifier alone or a 3D video action classifier alone. In addition, the total training time for the mixed 2D-3D video action classifier is better than multi-pathway 3D networks, such as SlowFast, and not much longer than a 3D video action classifier alone.

Figure 6:
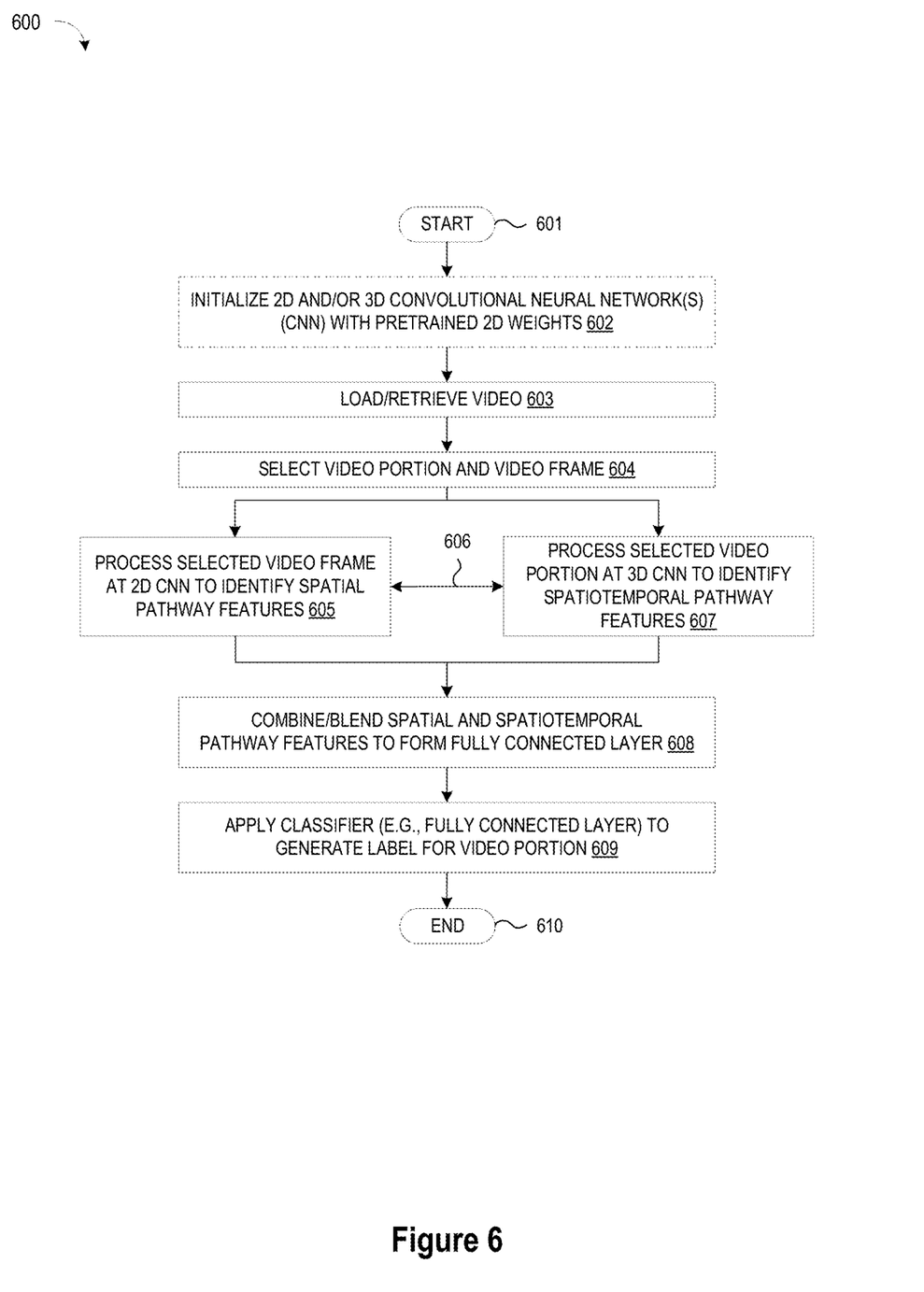
FIG. 6 illustrates a simplified flow chart showing the logic for classifying video action in accordance with selected embodiments of the present disclosure.

To provide additional details for an improved understanding of selected embodiments of the present disclosure, reference is now made to FIG. 6 which depicts a simplified flow chart 600 showing the logic for classifying video action. The processing shown in FIG. 6 may be performed by a cognitive system, such as the first computing system 10, server computing system 101, or other natural language question answering system.

FIG. 6 processing commences at 601, such as when video action classifier is being designed, initiated, or otherwise activated to classify and label input video action. At startup, a first neural network-based image classification model may be retrieved or loaded from memory, such as a 2D ResNet-50 convolutional neural network which can be loaded as pretrained version of a 2D network trained on more than a million images from the ImageNet database, though other pretrained deep neural networks may also be used. In addition, one or more additional neural network-based image classification models may be retrieved or loaded from memory, such as a 3D ResNet-50 convolutional neural network which can be loaded, retrieved, or derived from the first neural network-based image classification model, though any suitable 3D neural network model may also be used. For example, at least one of the additional neural network-based image classification models may be a 3D CNN model that is inflated from the pretrained 2D ResNet-50 CNN model. In selected embodiments, a first computing system (e.g., computing system 10) may use machine learning, natural language processing (NLP), and/or artificial intelligence (AI) processing techniques, alone or in combination, to initialize and train the 2D and 3D CNN models. Over multiple training periods or iterations/epochs, the 2D and 3D CNN models are able to correctly extract spatial and spatiotemporal features from the selected video image(s).

At step 602, either or both of the 2D and 3D CNN models are initialized or trained with the pretrained 2D weights, thereby initializing both the spatial and spatiotemporal pathways. In selected embodiments, a first computing system (e.g., computing system 10) may use the pre-trained weights 108 to initialize the CNN models 107 to generate the 2D and 3D CNN-based pathways 18A, 18B. In the event that these models are already trained when obtained at step 601, then the initialization or training step may be skipped, as indicated by the dashed box at step 602.

At step 603, the input video that is to be analyzed for video action classification is loaded or retrieved from memory. In selected embodiments, a first computing system (e.g., computing system 10) may load or retrieve the input video from the input video storage 107. In addition to retrieving an input video that was previously recorded and stored, an input video may be loaded in real time by receiving a video stream or feed from an input camera or other suitable video input device that uses an adhoc wireless or Bluetooth network to connect an input camera to a computer system which hosts a multipath video action classifier.

At step 604, a video portion and video frame are selected from the input video. In selected embodiments, the selected video portion includes a plurality of video frames which relate to the video action to be classified from the input video, where the video frames may be adjacent video frames or may be video frames that are separate from one another. In addition, the selected video frame relates to the video action being classified, and may be selected from the selected plurality of video frames. For example, the selected video frame may be the middle frame from each input video being classified, and the selected video portion may be a plurality of extracted frames (e.g., every 8 frames) from the input video being classified. In selected embodiments, a first computing system (e.g., computing system 10) may store the selected video frame(s) in the input video/image buffer 107.

At steps 605-607, multiple, parallel processing pathways, including a 2D CNN-based pathway and a 3D CNN-based pathway, are used to process the selected video frame and video portion to identify, respectively, spatial and spatiotemporal features. In selected embodiments, the selected frame is sent to the 2D convolutional neural network for processing at step 605 concurrently with sending the selected video portion to the 3D convolutional neural network for processing at step 607. As indicated by the connection line 606 between steps 605 and 607, the spatial features extracted from intermediate 2D CNN processing stages (at step 605) may be fused with the spatiotemporal features derived by the intermediate 3D CNN processing stages (at step 607). In selected embodiments, a first computing system (e.g., computing system 10) may use a neural information processing device 12 to execute the multipath video action classifier 16 when processing the selected video frame and video portion to identify spatial and spatiotemporal features.

At step 608, the extracted spatial features from the selected video frame (at step 605) are combined and/or blended with extracted spatiotemporal features from the selected video portion (at step 606) to connect to a fully connected final layer. In selected embodiments, a first computing system (e.g., computing system 10) may apply the classifier using vector processing techniques to form a fully connected layer group or cluster vector by concatenating the final stage spatial feature vector output from the 2D CNN-based pathway with the final stage spatiotemporal vector output from the 3D CNN-based pathway.

At step 609, the classifier is applied to the concatenated vector from step 608, and generates an output label for the input video. In the resulting layer, each bit position in the layer represents a different candidate classification label, so that the bit position in the fully connected layer which is "set" or "1" represents the highest probability classification label outcome for the input video. In selected embodiments, a first computing system (e.g., computing system 10) may use the feature blend module 19 to identify an output classification label which corresponds to the fully connected layer. At step 610, the process ends.

By now, it will be appreciated that there is disclosed herein a system, method, apparatus, and computer program product for classifying video action. In selected embodiments, an information handling system having a processor and a memory receives an input video for action analysis. In addition, the information handling system loads a plurality of processing pathways, including a 2D convolutional neural network processing pathway and a 3D convolutional neural network processing pathway. In selected embodiments, the 3D convolutional neural network processing pathway is formed by inflating the 2D convolutional neural network processing pathway. In other embodiments, the spatial features at each stage of the 2D convolutional neural network processing pathway are fused with corresponding spatiotemporal features at each stage of the 3D convolutional neural network processing pathway. In selected embodiments, the 2D and 3D convolutional neural network processing pathways are initialized with pretrained weights. The initialization process may include training a final, fully connected layer of the 2D convolutional neural network processing pathway and the 3D convolutional neural network processing pathway with the pretrained weights for a first specified epoch training period. The initialization process may further include training, after the first specified epoch training period, all layers of the 2D convolutional neural network processing pathway and the 3D convolutional neural network processing pathway with the pretrained weights for a second specified epoch training period. The information handling system is also used to select a first video frame and a first plurality of video frames from the input video which may be stored in a video/image buffer. Once the video frames are selected, the first video frame is processed with the 2D convolutional neural network processing pathway to extract spatial features classifying the first video frame. In addition, the first plurality of video frames is processed with the 3D convolutional neural network processing pathway to extract spatiotemporal features classifying the first plurality of video frames. In selected embodiments, the processing with the 2D and 3D convolutional neural network processing pathways occurs in parallel. The information handling system may also combine the spatial features with the spatiotemporal features to generate a classification label for the video action. In such embodiments, the combination may be performed by concatenating a final spatial features from the 2D convolutional neural network processing pathway with a final spatiotemporal features from the 3D convolutional neural network processing pathway to connect a final, fully connected layer that is used for classifying the video action of the video.

While particular embodiments of the present invention have been shown and described, it will be obvious to those skilled in the art that, based upon the teachings herein, changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method for classifying video action, the method comprising:
   receiving, by an information handling system comprising a processor and a memory, a video for action analysis;
   loading, by the information handling system, a plurality of processing pathways comprising a 2D convolutional neural network processing pathway and a 3D convolutional neural network processing pathway that is formed by inflating the 2D convolutional neural network processing pathway;
   selecting, by the information handling system, a first video frame and a first plurality of video frames from the video;

processing, by the information handling system, the first video frame with the 2D convolutional neural network processing pathway to extract spatial features classifying the first video frame;

processing, by the information handling system, the first plurality of video frames with the 3D convolutional neural network processing pathway to extract spatiotemporal features classifying the first plurality of video frames; and combining, by the information handling system, the spatial features with the spatiotemporal features to generate a classification label for the video action.

2. The computer-implemented method of claim 1, further comprising initializing, by the information handling system, the 2D convolutional neural network processing pathway and the 3D convolutional neural network processing pathway with pretrained weights.

3. The computer-implemented method of claim 2, further comprising training, by the information handling system, a final fully connected layer of the 2D convolutional neural network processing pathway and the 3D convolutional neural network processing pathway with the pretrained weights for a first specified epoch training period.

4. The computer-implemented method of claim 3, further comprising:

training, after the first specified epoch training period, all layers of the 2D convolutional neural network processing pathway and the 3D convolutional neural network processing pathway with the pretrained weights for a second specified epoch training period.

5. The computer-implemented method of claim 1, where the spatial features at each stage of the 2D convolutional neural network processing pathway are fused with corresponding spatiotemporal features at each stage of the 3D convolutional neural network processing pathway.

6. The computer-implemented method of claim 1, where combining the spatial features with the spatiotemporal features comprises concatenating a final spatial feature from the 2D convolutional neural network processing pathway with a final spatiotemporal feature from the 3D convolutional neural network processing pathway to connect to a final, fully connected layer that is used for classifying the video action of the video.

7. An information handling system comprising:
one or more processors;
a memory coupled to at least one of the processors;
a set of instructions stored in the memory and executed by at least one of the processors to classify video action, wherein the set of instructions are executable to perform actions of:
receiving, by the system, a video for action analysis;
loading, by the system, a plurality of processing pathways comprising a 2D convolutional neural network processing pathway and a 3D convolutional neural network processing pathway that is formed by inflating the 2D convolutional neural network processing pathway;
selecting, by the system, a first video frame and a first plurality of video frames from the video;
processing, by the system, the first video frame with the 2D convolutional neural network processing pathway to extract spatial features classifying the first video frame;
processing, by the system, the first plurality of video frames with the 3D convolutional neural network processing pathway to extract spatiotemporal features classifying the first plurality of video frames; and
combining, by the system, the spatial features with the spatiotemporal features to generate a classification label for the video action.

8. The information handling system of claim 7, wherein the set of instructions are executable to initialize the 2D convolutional neural network processing pathway and the 3D convolutional neural network processing pathway with pretrained weights.

9. The information handling system of claim 8, wherein the set of instructions are executable to train a final fully connected layer of the 2D convolutional neural network processing pathway and the 3D convolutional neural network processing pathway with the pretrained weights for a first specified epoch training period.

10. The information handling system of claim 9, wherein the set of instructions are executable to train, after the first specified epoch training period, all layers of the 2D convolutional neural network processing pathway and the 3D convolutional neural network processing pathway with the pretrained weights for a second specified epoch training period.

11. The information handling system of claim 7, where the spatial features at each stage of the 2D convolutional neural network processing pathway are fused with corresponding spatiotemporal features at each stage of the 3D convolutional neural network processing pathway.

12. The information handling system of claim 7, wherein the set of instructions are executable to provide combine the spatial features with the spatiotemporal features by concatenating a final spatial feature from the 2D convolutional neural network processing pathway with a final spatiotemporal feature from the 3D convolutional neural network processing pathway to connect to a final, fully connected layer that is used for classifying the video action of the video.

13. A computer program product stored in a computer readable storage medium, comprising computer instructions that, when executed by an information handling system comprising a processor and a memory, causes the system to classify video action by:
receiving, by the system, a video for action analysis;
loading, by the system, a plurality of processing pathways comprising a 2D convolutional neural network processing pathway and a 3D convolutional neural network processing pathway that is formed by inflating the 2D convolutional neural network processing pathway;
selecting, by the system, a first video frame and a first plurality of video frames from the video;
processing, by the system, the first video frame with the 2D convolutional neural network processing pathway to extract spatial features classifying the first video frame;
processing, by the system, the first plurality of video frames with the 3D convolutional neural network processing pathway to extract spatiotemporal features classifying the first plurality of video frames; and
combining, by the system, the spatial features with the spatiotemporal features to generate a classification label for the video action.

14. The computer program product of claim 13, further comprising computer instructions that, when executed by the system, causes the system to initialize the 2D convolutional neural network processing pathway and the 3D convolutional neural network processing pathway with pretrained weights.

15. The computer program product of claim 14, further comprising computer instructions that, when executed by the system, causes the system to train a final fully connected layer of the 2D convolutional neural network processing pathway and the 3D convolutional neural network processing pathway with the pretrained weights for a first specified epoch training period.

16. The computer program product of claim 15, further comprising computer instructions that, when executed by the system, causes the system to train, after the first specified epoch training period, all layers of the 2D convolutional neural network processing pathway and the 3D convolutional neural network processing pathway with the pretrained weights for a second specified epoch training period.

17. The computer program product of claim 13, where the spatial features at each stage of the 2D convolutional neural network processing pathway are fused with corresponding spatiotemporal features at each stage of the 3D convolutional neural network processing pathway.

* * * * *